(12) United States Patent
Appireddygari Venkataramana et al.

(10) Patent No.: US 10,719,361 B2
(45) Date of Patent: Jul. 21, 2020

(54) SYNCHRONOUS MONITORING AND FEEDBACK SYSTEM TO DYNAMICALLY OPTIMIZE THE RESOURCE USAGE OF BACKUP SERVICE

(71) Applicant: EMC IP Holding Company LLC, Hopkinton, MA (US)

(72) Inventors: Mahesh Reddy Appireddygari Venkataramana, Bangalore (IN); Lakshminarayanan Muniswamy, Bangalore (IN); Tushar B. Dethe, Bangalore (IN); Swaroop Shankar D H, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 110 days.

(21) Appl. No.: 16/153,192

(22) Filed: Oct. 5, 2018

(65) Prior Publication Data
US 2020/0110637 A1      Apr. 9, 2020

(51) Int. Cl.
*G06F 9/50* (2006.01)
*G06F 11/14* (2006.01)
*G06F 3/12* (2006.01)

(52) U.S. Cl.
CPC .............. *G06F 9/50* (2013.01); *G06F 3/1218* (2013.01); *G06F 9/5027* (2013.01); *G06F 11/1456* (2013.01); *G06F 2209/501* (2013.01)

(58) Field of Classification Search
CPC ...... G06F 9/5027; G06F 9/50; G06F 11/1456; G06F 3/1218
See application file for complete search history.

(56) References Cited

U.S. PATENT DOCUMENTS 6,487,578 B2 * 11/2002 Ranganathan ............ G06F 9/50
                                                              714/E11.192
6,996,374 B1 *  2/2006 Bao ........................ H04W 24/02
                                                              455/423

(Continued)

OTHER PUBLICATIONS

Marti et al., "Optimal State Feedback Based Resource Allocation for Resource-Constrained Control Tasks" (Year: 2004).*

(Continued)

*Primary Examiner* — Philip H Nguyen
(74) *Attorney, Agent, or Firm* — Womble Bond Dickinson (US) LLP

(57) ABSTRACT

A method, apparatus, and system for regulating resource usage of a backup application is disclosed. The operations comprise: continuously monitoring and obtaining system resource usage, process states, and backup policy parameters; generating a normalized band value based on the system resource usage, the process states, and the backup policy parameters; generating a straight line plot based on the band value, a total CPU value, and a deviation value; calculating a slope of the straight line plot, wherein the slope is utilized to generate a deviation value based further on a first value and a second value received from a user, and wherein the deviation value is fed back to the generation of the straight line plot to normalize the slope; generating control values based on the slope; and adjusting performance of the backup application based on the control values to regulate system resource usage of the backup application.

21 Claims, 4 Drawing Sheets

(56) References Cited

U.S. PATENT DOCUMENTS

| | | | | |
|---|---|---|---|---|
| 7,139,846 B1* | 11/2006 | Rossi | ................... | G06F 11/1461 |
| | | | | 710/6 |
| 9,098,333 B1* | 8/2015 | Obrecht | .................... | G06F 9/50 |
| 9,519,522 B1* | 12/2016 | Phadke | ................. | G06F 9/5094 |
| 2008/0184063 A1* | 7/2008 | Abdulvahid | ........ | G06F 11/1469 |
| | | | | 714/6.3 |

OTHER PUBLICATIONS

Garg et al., "A Methodology for Detection and Estimation of Software Aging" (Year: 1998).*

* cited by examiner

SYNCHRONOUS MONITORING AND FEEDBACK SYSTEM TO DYNAMICALLY OPTIMIZE THE RESOURCE USAGE OF BACKUP SERVICE

FIELD OF THE INVENTION

Embodiments of the present invention relate generally to data storage systems. More particularly, embodiments of the invention relate to a method, apparatus, and system for dynamically adjusting system resource usage of a backup application.

BACKGROUND

In the traditional enterprise data protection scenario, the backup window (e.g., the time to perform a backup) is decided by the backup administrator based on peak usage trends on the production environment. With an enterprise level data as the backup interest, protection of such critical data becomes the priority. Meanwhile, the peak load balance on the production environment is required as well. Consequently, the backup administrator would need to monitor the resource usage continuously and adjust the backup window to mitigate the peak load on the production server. Also, during the backup phase, the cumulative load from both backup application and native production applications consume important system resources causing performance bottleneck.

With the increase in the scale of production, of native applications and in the number of production servers, the system resource monitoring could become significant overhead to the backup/system administrator. Also, such human decisions could be prone to inaccuracies, and may not always lead to the optimal utilization of system resources.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
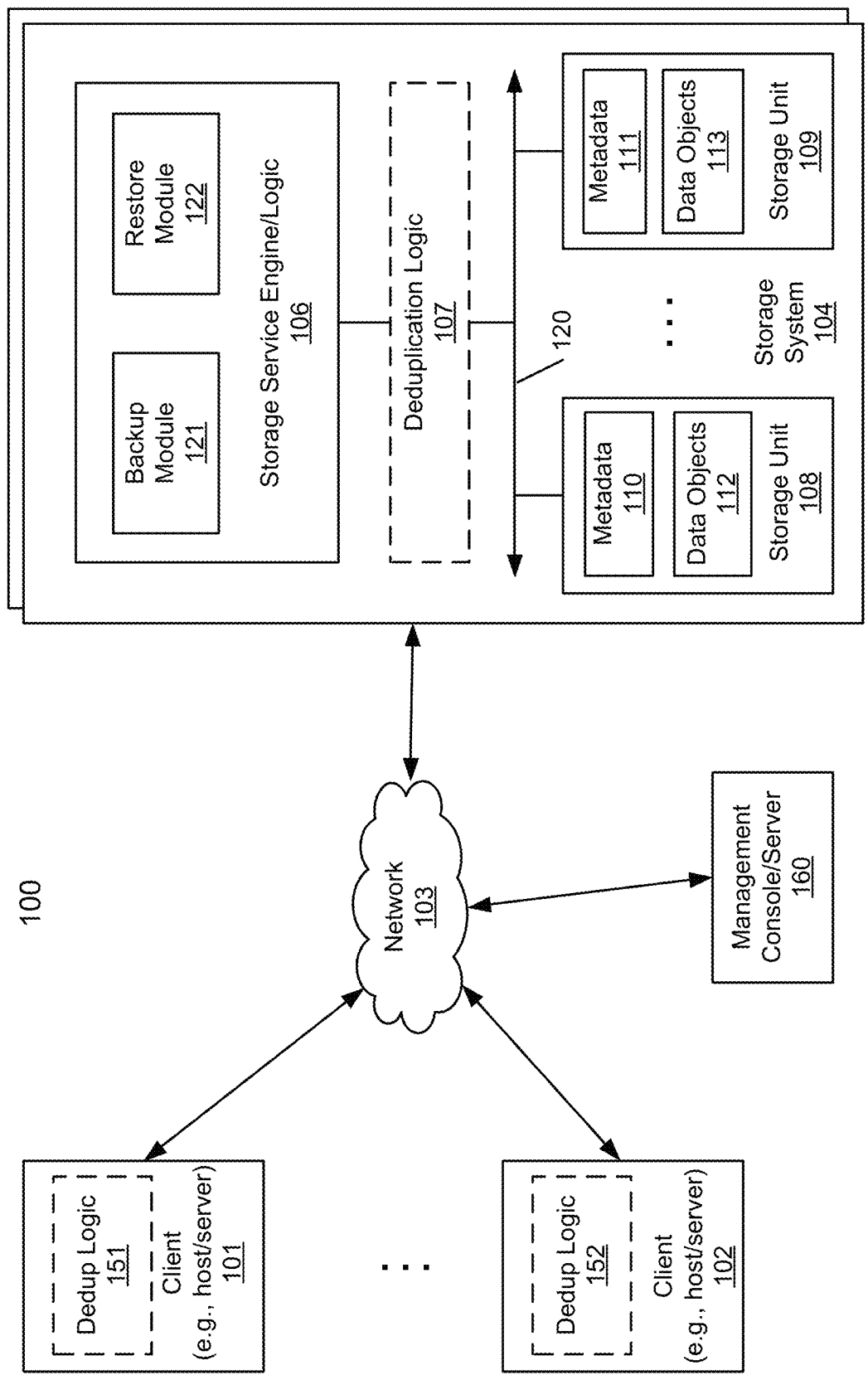
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Enterprise applications like database applications or mailbox servers are designed in such a way that they can work in a distributed manner and at the same time be highly available. This results in consumption of majority of system resources leaving little room for other applications to run. The resources left for other applications depend on the workload of the application: if the workload is high, fewer resources are available for other applications; if the workload is low, more resources are available for other applications.

It can becomes very difficult for a backup administrator to manually control the behavior of production applications and of the backup application as both of them are trying to contend for system resources. Resource utilization by the backup application impacts the production activity, and vice versa. On the other hand, if the resource utilization by native production applications is low, the backup application can take advantage of the spare resources, and speed up the backup process.

Embodiments of the disclosure relate to a method for such an environment, where the method comprises a dynamic solution to adjust the system resource usage by synchronously monitoring the load on the production environment and minimizing the deviation in the load by a synchronous feedback system. Embodiments of the disclosure may be implemented with such products as the Dell EMC Networker.

In a conventional data protection scenario in large scale enterprises, the backup administrator would evaluate the system under consideration to schedule the backup window in such a way that the native enterprise applications are given the priority over the backup application in terms of system resources utilization.

For example, an administrator setting up a backup solution like Dell EMC Networker on a Microsoft Exchange server environment needs to consider the load pattern over multiple nodes in the data center, which includes the network bandwidth, server resource utilization, and native application streams. This is because the backup processes running on the production server would consume the resources without regard for the native production applications' need for the resources. The resource sharing is manually enforced by the administrator for efficient resources utilization by both backup processes and native production applications.

Apparently, the backup administrator's decisions with respect to the sharing of resources between the backup application and native applications could not be very accurate, because of the fact that the backup application might not always utilize the maximum resources, unless there is a large amount of data that is being backed up. Moreover, with such manual enforcement of the policy on resource usage, the backup application may underperform in certain cases due to a dynamic workload of the native production application. The reverse is true as well because the native applications may be equally resource hungry.

In the conventional scenario, the backup administrator may need to analyze distributed machines spanning multiple data centers to arrive at decision. Due to complexity and increased scale, such a decision may not be optimal. Moreover, this can be a tedious task, considering the process level deltas between the workloads at different instants of time.

Therefore, embodiments of the disclosure relate to a method for using a synchronous monitoring and feedback system to dynamically adjust the resource usage according to the usage load on the host system.

In one embodiment, a monitoring system may identify the resources on the host, state of the processes of interest on the host, and the type of backup policy chosen by the user. Data received from the monitoring system is then mapped to a common encoded band value. This band value will be used in calculating the slope of the change in the resource usage, which is compared against the high/low values chosen by the user. The deviation is then calculated, and the slope minimized. The gradient normalization and the decision from the user constitute the feedback section. With this method, the peak load on the production server attributable to the backup process may be reduced considerably. The solution requires monitoring of the total system resources utilized by backup process on the production server, and functions synchronously.

According to one embodiment, the method works in a synchronous fashion, with all the components functioning at any instant of time on the same clock cycle of the Central Processing Unit (CPU). The system parameters and backup application parameters are monitored at the monitoring section. The raw data from the identifiers in monitoring section are converted into a single band value, which is fed into the analyzer section to generate a simple straight line plot. This value is then forwarded in an analyzed format to calculate the slope from the plot at the gradient calculator. At the feedback section, the value is received by the resource manager, and the resources are regulated accordingly.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
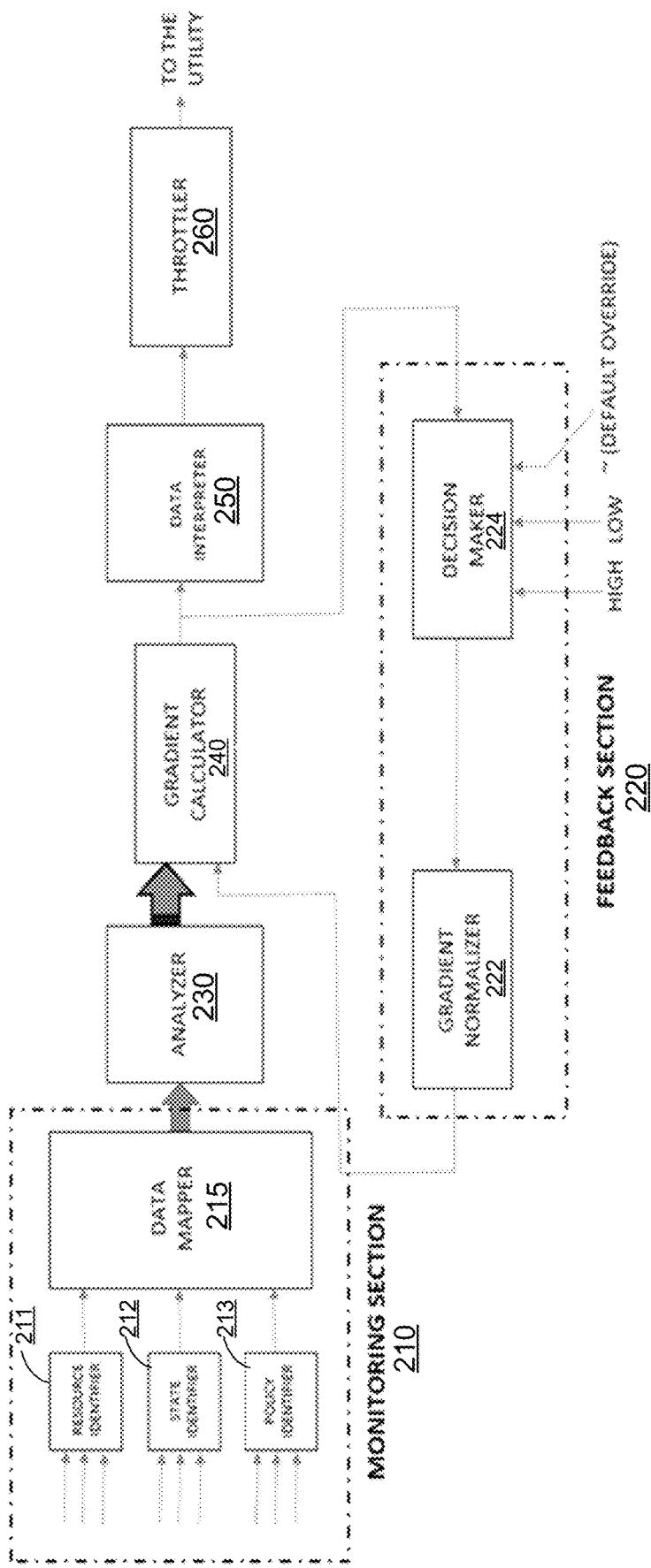
FIG. 2 is a block diagram illustrating various components associated with a method for synchronously regulating resource usage of a backup application according to one embodiment of the invention.

Referring to FIG. 2, a block diagram 200 illustrating various components associated with a method for synchronously regulating resource usage of a backup application according to one embodiment of the invention is shown.

In one embodiment, the method works in a synchronous fashion with all the components functioning at any instant of time on the same clock cycle of the CPU. The system parameters and backup application parameters are monitored at the monitoring section 210. The monitoring section 210 comprises the resource, state and policy identifiers 211-213. The resource identifier 211 poll for the system resources, such as CPU usage, memory usage, input/output (I/O) operations, processes, threads, and disks available. The state identifier 212 polls for the state of the processes/threads on the host, e.g., an IDLE, READY, RUNNING or STOP state. This type of monitoring would help the data mapper 215 to achieve a well approximated band value closer to the best possible performance value by the service. Finally, a policy identifier 213 gathers the user defined backup policy parameters and backup frequency and forwards the same to the data mapper 215. The data mapper 215 acts as a value calculator using the raw data received from the identifiers 211-213, and converts them to a normalized band value indicative of a load condition on the host system. In different embodiment, the band value may be any integer between 0 and 100 (or between 0 and 1000, 0 and 10000, etc.). A band value with a larger dynamic range may be more precise.

For example, the data mapper 215 may receive the following information from identifiers 211-213: BACKUP PROCESS(IDLE) (i.e., the backup process is in an IDLE state), NATIVE PROCESSES(RUNNING) (i.e., the native production process is in a RUNNING state), POLICY(DAY-DAY-24) (i.e., the backup policy is to take a snapshot on a daily basis and retain the snapshot for a day, with the number of snapshots being 24), CPU AVAILABLE(21 GB) (i.e., the available physical memory for the processor/CPU is 21 Gigabytes "GB"), I/O(4 WRITE and 5 READ OP) (I/O operations comprise 4 write operations and 5 read operations), MISC_PROCESSES(STOPPED) (i.e., other miscellaneous processes are in a STOPPED state), MEMORY_CON(40%) (i.e., the memory consumption at the current instant of time is 40%). In this example, the band value may be 20 or close to 20, because data received from identifiers 211-213 generally indicate a non-critical load on the host. The band value is the base for the next, analyzer 230 stage, where a straight line plot with the band value as the y term is generated. The x term of the straight line plot represents the time instant at the clock cycle. The straight line plot further comprises a constant c term, which corresponds to the total CPU value (i.e., the total physical CPU resources allocated for the virtual host or client that is the backup interest, which is usually a fixed value over time). The plot is generated at the analyzer 230, and is continuously transferred to the gradient calculator 240. The gradient calculator calculates the value of the gradient (i.e., slope m) based the given band value (y), time instant (x), and total CPU value (c), as well as a value received from the feedback section 220. The slope m can be calculated based on the following equation: $m=[(y-c)/x]+k$, where k is the deviation calculator value received from the feedback section 220. The deviation value k normalizes the slope m. In particular, the value k keeps the slope m within a desired range to make sure that the slope m does not exceed the upper bound or go below the lower bound chosen by the administrator. In other words, the value k is negatively correlated with the deviation of the term (y−c)/x from a desired slope value, and is indicative of a deviation of actual system resource usage from desired actual system resource usage.

The result from the gradient calculator 240 is sent to the data interpreter 250. Also, the same result is forwarded to the decision maker 224. The decision maker 224 may have a default behavior that is independent from the result received from the gradient calculator. The user/administrator may disable the default behavior through manipulation of a control signal, and specify a HIGH value and a LOW value as desired. The HIGH and LOW values may be chosen by the user empirically based upon, e.g., the input workload and available resources to serve the load. HIGH/LOW values are utilized by the decision maker 224, which compares the HIGH/LOW values against the possible slope m received from the gradient calculator 240. Based on the comparison, the decision maker 224 provides the gradient normalizer 222 with a positive, negative or zero signal, indicative of a direction in which the slope m should be adjusted (e.g., decrease, increase, or no change). The signal is received by the gradient normalizer 222, where a substituted calculation is performed to normalize the gradient with the desired slope value m. This deviation value is thereafter provided to the gradient calculator 240 as the value k.

At the data interpreter 250, control values for the parameters collected by the identifiers (e.g., processor usage, the number of thread pools, the number of input/output (I/O) operations, process states, backup policy parameters, etc.) may be generated based on the gradient/slope value. The generation of the control values from the slope value may be based on a number of prepopulated rules (e.g., embodied in a lookup table), which can be pre-programmed by the administrator/user based on empirical data. These target values are sent to the throttler 260, which, based on the control values received from the data interpreter 250, overrides the values of the parameters associated with the backup application on the host system as necessary to throttle the backup application, so that the backup application and the production application may perform optimally.

Figure 3:
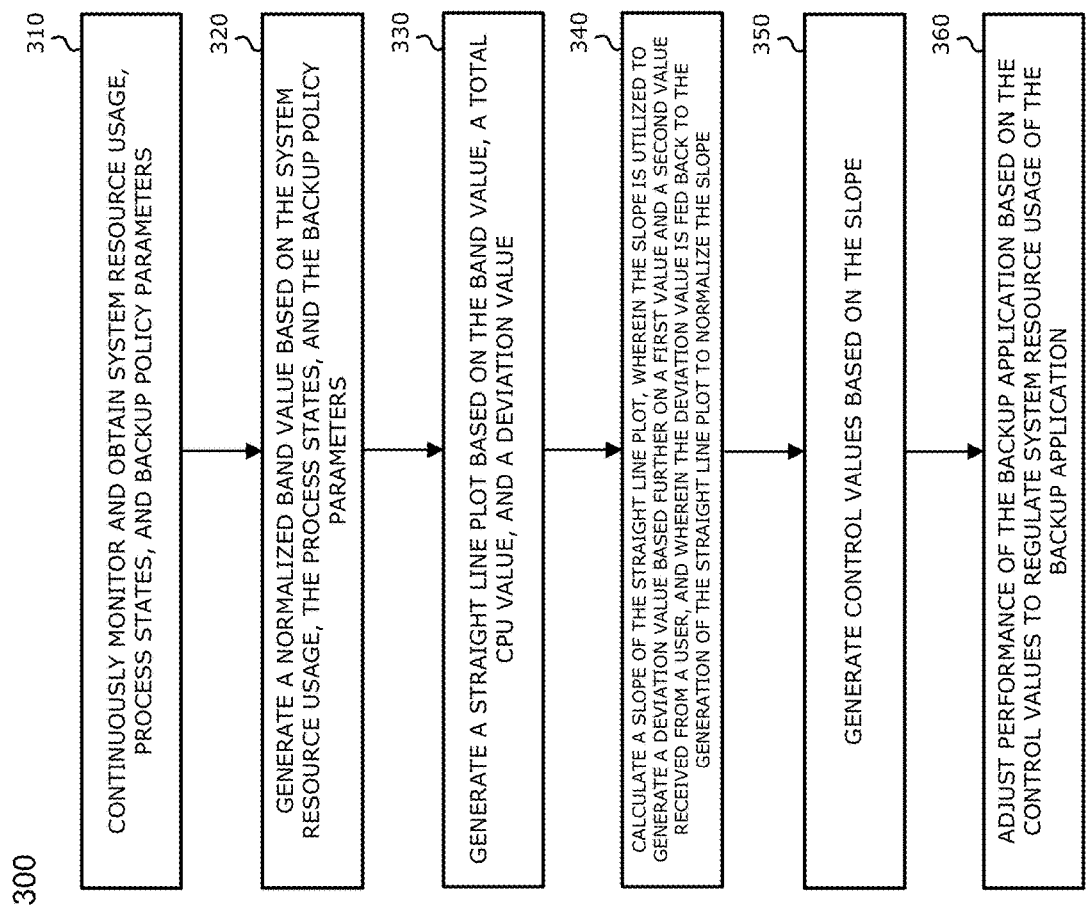
FIG. 3 is a flow diagram illustrating a process of synchronously regulating resource usage of a backup application according to one embodiment of the invention.

FIG. 3 is a flow diagram illustrating a process of synchronously regulating resource usage of a backup application according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by processor 1501 of FIG. 4. Referring to FIG. 3, at block 310, system resource usage, process states, and backup policy parameters may be continuously monitored and obtained. The system resource usage may comprise usage of the processor (CPU), the number of thread pools, the number of I/O operations, etc.

At block 320, a normalized band value may be generated based on the system resource usage, the process states, and the backup policy parameters. At block 330, a straight line plot may be generated based on the band value, a total CPU value, and a deviation value. At block 340, a slope of the straight line plot may be calculated, wherein the slope is utilized to generate a deviation value based further on a first (high) value and a second (low) value received from a user, and wherein the deviation value is fed back to the generation of the straight line plot to normalize the slope. At block 350, control values may be generated based on the slope. At block 360, performance of the backup application may be adjusted based on the control values to regulate system resource usage of the backup application.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
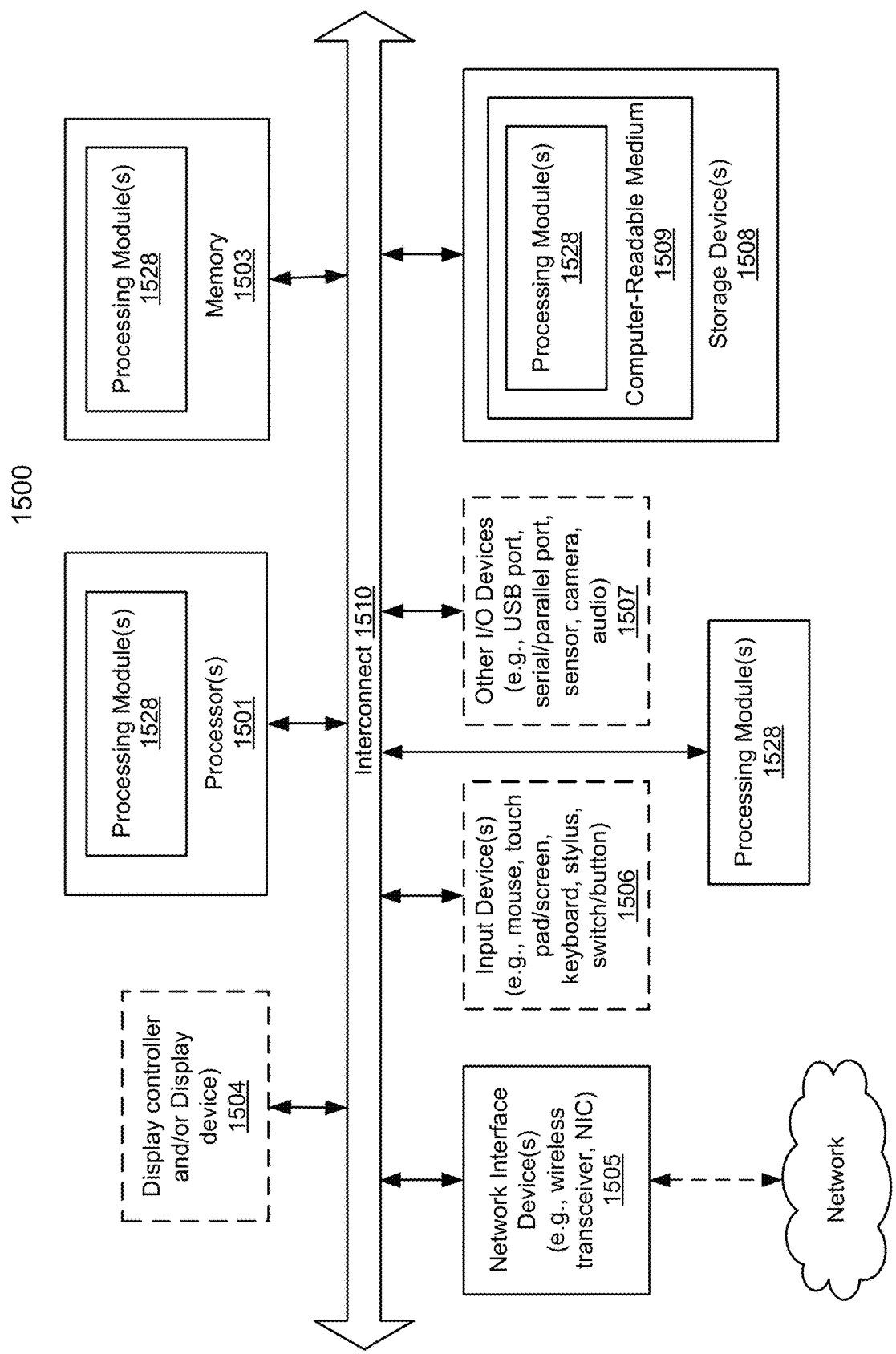
FIG. 4 is a block diagram illustrating a data processing system according to one embodiment.

FIG. 4 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS/iOS from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for synchronously regulating resource usage of a backup application, comprising:
   continuously monitoring and obtaining system resource usage, process states, and backup policy parameters;
   generating a normalized band value based on the system resource usage, the process states, and the backup policy parameters;
   generating a straight line plot based on the band value, a total CPU value, and a deviation value;
   calculating a slope of the straight line plot, wherein the slope is utilized to generate a deviation value based further on a first value and a second value received from a user, and wherein the deviation value is fed back to the generation of the straight line plot to normalize the slope;

generating control values based on the slope; and adjusting performance of the backup application based on the control values to regulate system resource usage of the backup application.

2. The method of claim 1, wherein the system resource usage comprises one or more of: processor usage, a number of thread pools, or a number of input/output (I/O) operations.

3. The method of claim 1, where in the process states comprise, for each process, one of: an IDLE state, a READY state, a RUNNING state, or a STOP state.

4. The method of claim 1, wherein the band value is indicative of a system load.

5. The method of claim 1, wherein the straight line is represented with an equation in a form of $m=[(y-c)/x]+k$, where m is the slope, y is the band value, c is the total CPU value, x is time, and k is the deviation value.

6. The method of claim 1, wherein the deviation value is indicative of a deviation of actual system resource usage from desired system resource usage.

7. The method of claim 1, wherein adjusting performance of the backup application based on the control values optimizes performance of both the backup application and at least one production application.

8. An apparatus for synchronously regulating resource usage of a backup application, comprising:

means for continuously monitoring and obtaining system resource usage, process states, and backup policy parameters;

means for generating a normalized band value based on the system resource usage, the process states, and the backup policy parameters;

means for generating a straight line plot based on the band value, a total CPU value, and a deviation value;

means for calculating a slope of the straight line plot, wherein the slope is utilized to generate a deviation value based further on a first value and a second value received from a user, and wherein the deviation value is fed back to the generation of the straight line plot to normalize the slope;

means for generating control values based on the slope; and means for adjusting performance of the backup application based on the control values to regulate system resource usage of the backup application.

9. The apparatus of claim 8, wherein the system resource usage comprises one or more of: processor usage, a number of thread pools, or a number of input/output (I/O) operations.

10. The apparatus of claim 8, where in the process states comprise, for each process, one of: an IDLE state, a READY state, a RUNNING state, or a STOP state.

11. The apparatus of claim 8, wherein the band value is indicative of a system load.

12. The apparatus of claim 8, wherein the straight line is represented with an equation in a form of $m=[(y-c)/x]+k$, where m is the slope, y is the band value, c is the total CPU value, x is time, and k is the deviation value.

13. The apparatus of claim 8, wherein the deviation value is indicative of a deviation of actual system resource usage from desired system resource usage.

14. The apparatus of claim 8, wherein adjusting performance of the backup application based on the control values optimizes performance of both the backup application and at least one production application.

15. A data processing system, comprising:

a processor; and a memory coupled to the processor to store instructions, which when executed by the processor, cause the processor to perform synchronous performance regulation operations, the operations including:

continuously monitoring and obtaining system resource usage, process states, and backup policy parameters;

generating a normalized band value based on the system resource usage, the process states, and the backup policy parameters;

generating a straight line plot based on the band value, a total CPU value, and a deviation value;

calculating a slope of the straight line plot, wherein the slope is utilized to generate a deviation value based further on a first value and a second value received from a user, and wherein the deviation value is fed back to the generation of the straight line plot to normalize the slope;

generating control values based on the slope; and adjusting performance of the backup application based on the control values to regulate system resource usage of the backup application.

16. The data processing system of claim 15, wherein the system resource usage comprises one or more of: processor usage, a number of thread pools, or a number of input/output (I/O) operations.

17. The data processing system of claim 15, where in the process states comprise, for each process, one of: an IDLE state, a READY state, a RUNNING state, or a STOP state.

18. The data processing system of claim 15, wherein the band value is indicative of a system load.

19. The data processing system of claim 15, wherein the straight line is represented with an equation in a form of $m=[(y-c)/x]+k$, where m is the slope, y is the band value, c is the total CPU value, x is time, and k is the deviation value.

20. The data processing system of claim 15, wherein the deviation value is indicative of a deviation of actual system resource usage from desired system resource usage.

21. The data processing system of claim 15, wherein adjusting performance of the backup application based on the control values optimizes performance of both the backup application and at least one production application.

* * * * *